US011044689B2

(12) United States Patent
Kuang

(10) Patent No.: US 11,044,689 B2
(45) Date of Patent: Jun. 22, 2021

(54) FINGERPRINT POSITIONING METHOD AND RELATED DEVICE

(71) Applicant: Huawei Technologies Co., Ltd., Shenzhen (CN)

(72) Inventor: Yunsheng Kuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 58 days.

(21) Appl. No.: 16/499,584

(22) PCT Filed: Apr. 14, 2017

(86) PCT No.: PCT/CN2017/080614
§ 371 (c)(1),
(2) Date: Sep. 30, 2019

(87) PCT Pub. No.: WO2018/176511
PCT Pub. Date: Oct. 4, 2018

(65) Prior Publication Data
US 2020/0045665 A1 Feb. 6, 2020

(30) Foreign Application Priority Data
Mar. 28, 2017 (CN) .......................... 201710193703.4

(51) Int. Cl.
*H04W 64/00* (2009.01)
*H04B 17/318* (2015.01)
(Continued)

(52) U.S. Cl.
CPC ............ *H04W 64/00* (2013.01); *G06F 16/29* (2019.01); *H04B 17/318* (2015.01); *H04W 4/06* (2013.01);
(Continued)

(58) Field of Classification Search
CPC ......... H04W 64/00; H04W 4/06; H04W 8/18; H04W 84/12; H04B 17/318; G06F 16/29
See application file for complete search history.

(56) References Cited

U.S. PATENT DOCUMENTS

2009/0273465 A1   11/2009  Shamir et al.
2013/0281122 A1*  10/2013  Zelinka .................. G01S 5/0252
                                                              455/456.3
(Continued)

FOREIGN PATENT DOCUMENTS

CN   103052154 A   4/2013
CN   103501537 A   1/2014
(Continued)

OTHER PUBLICATIONS

Machine Translation and Abstract of Chinese Publication No. CN103052154, dated Apr. 17, 2013, 15 pages.
(Continued)

*Primary Examiner* — Christine Ng
(74) *Attorney, Agent, or Firm* — Conley Rose, P.C.

(57) ABSTRACT

A system comprising a server and an electronic device, wherein the server is configured to: divide a to-be-positioned area into M sub-areas, wherein each sub-area has a corresponding fingerprint database; perform screening in the fingerprint database corresponding in each sub-area, and select BSSIDs of N APs in the fingerprint database to constitute a reference AP set; compare the BSSIDs of multiple wireless APs sent by the electronic device with BSSIDs in the M reference AP sets; determine a target reference AP set corresponding to a sub-area in which the electronic device is located; perform positioning calculation based on a fingerprint database corresponding to the target reference AP set; and determine a location of the electronic device.

20 Claims, 6 Drawing Sheets

(51) Int. Cl.
*G06F 16/29* (2019.01)
*H04W 4/06* (2009.01)
*H04W 8/18* (2009.01)
*H04W 84/12* (2009.01)
*H04W 88/08* (2009.01)

(52) U.S. Cl.
CPC .............. *H04W 8/18* (2013.01); *H04W 84/12* (2013.01); *H04W 88/08* (2013.01)

(56) References Cited

U.S. PATENT DOCUMENTS

| | | | | |
|---|---|---|---|---|
| 2017/0343638 | A1* | 11/2017 | Jampani | G01S 5/0252 |
| 2018/0109909 | A1* | 4/2018 | Banerjee | G06Q 20/12 |
| 2018/0180706 | A1* | 6/2018 | Li | G01S 5/0294 |

FOREIGN PATENT DOCUMENTS

| | | |
|---|---|---|
| CN | 104202818 B | 10/2015 |
| CN | 105813192 A | 7/2016 |
| CN | 105898713 A | 8/2016 |
| KR | 20100021791 A | 2/2010 |
| WO | 2015135478 A1 | 9/2015 |
| WO | 2016086993 A1 | 6/2016 |

OTHER PUBLICATIONS

Machine Translation and Abstract of Chinese Publication No. CN103501537, dated Jan. 8, 2014, 14 pages.
Machine Translation and Abstract of Chinese Publication No. CN104202818, dated Oct. 7, 2015, 9 pages.
Machine Translation and Abstract of International Publication No. WO2015135478, dated Sep. 17, 2015, 37 pages.
Machine Translation and Abstract of Korean Publication No. KR20100021791, dated Feb. 26, 2010, 15 pages.
Yu, Z., et al., "Indoor Localisation Based on Smartphone," Computer Applications and Software, vol. 32, No. 6, Jun. 30, 2015, 6 pages.
Foreign Communication From A Counterpart Application, PCT Application No. PCT/CN2017/080614, English Translation of International Search Report dated Jun. 29, 2017, 2 pages.
Foreign Communication From A Counterpart Application, PCT Application No. PCT/CN2017/080614, English Translation of Written Opinion dated Jun. 29, 2017, 5 pages.

* cited by examiner

FINGERPRINT POSITIONING METHOD AND RELATED DEVICE

This application is a National Stage of International Application No. PCT/CN2017/080614, filed on Apr. 14, 2017, which claims priority to Chinese Patent Application No. 201710193703.4, filed on Mar. 28, 2017, both of which are hereby incorporated by reference in their entireties.

TECHNICAL FIELD

This application relates to the field of wireless positioning technologies, and in particular, to a fingerprint positioning method and a related device.

BACKGROUND

Rapid development of the mobile internet promotes rapid deployment of a wireless fidelity (Wireless Fidelity, Wi-Fi) access point (Access Point, AP). A large quantity of Wi-Fi APs start to be deployed in more indoor scenarios, such as a supermarket, an office building, and a station, to meet people's need of accessing a mobile network. This also makes it possible to use a Wi-Fi AP signal for indoor positioning. An indoor positioning service provider can use a deployed Wi-Fi AP to implement an indoor positioning function, and therefore a restriction that a related AP needs to be deployed by the indoor positioning service provider for indoor positioning is eliminated. The indoor positioning that is performed by using the Wi-Fi AP signal is expected to be widely applied at indoor sites such as a supermarket and an office building, to provide a convenient and efficient indoor positioning service and indoor positioning experience for a user and also provide a service application with a high added value for a merchant.

Among a plurality of Wi-Fi positioning algorithms, a great advantage of Wi-Fi fingerprint positioning is that positioning can be implemented by collecting a fingerprint database only in a positioning area without a need to obtain a deployment location of an AP. It is very convenient to apply and popularize the Wi-Fi fingerprint positioning. A principle of the Wi-Fi fingerprint positioning is that sampling points (for example, a distance between the sampling points is 1 to 2 m) are created in an area in which positioning needs to be performed, and a Wi-Fi receiving device (for example, a terminal device) performs sampling at each sampling point, records a location of the sampling point, an obtained received signal strength indicator (Received Signal Strength Indication, RSSI), and a basic service set identifier (Basic Service Set Identifier, BSSID) of an AP, and then performs a series of sampled data processing (filtering, averaging, and the like), to generate a fingerprint database of the positioning area and store the fingerprint database on a positioning server. When a user holds a terminal device and moves in the positioning area, the terminal device obtains RSSIs of a plurality of current APs and BSSIDs of the APs in real time, and matches the RSSIs and the BSSIDS that are of the APs and that are obtained in real time with the fingerprint database on the server, to obtain an estimated location. However, in a location calculation process in the prior art, usually all APs in the fingerprint database need to be used to perform related calculation. Consequently, a calculation amount is large, and recognition efficiency and accuracy are relatively low.

SUMMARY

A fingerprint positioning method and a related device are provided in embodiments of this application. According to this application, a problem that positioning efficiency is relatively low in an existing fingerprint positioning calculation process because a positioning calculation amount is large can be resolved.

According to a first aspect, an embodiment of this application provides a fingerprint positioning method, and the fingerprint positioning method may include:

dividing a to-be-positioned area into M sub-areas, where each sub-area has a corresponding fingerprint database, the fingerprint database includes a plurality of pieces of fingerprint data, the fingerprint data is a basic service set identifier BSSID and a received signal strength indicator RSSI of a wireless access point AP that are detected at each of a plurality of sampling points in a corresponding sub-area, and M is an integer greater than or equal to 1; performing screening in the fingerprint database corresponding to each sub-area, and selecting BSSIDs of N APs in the fingerprint database to constitute a reference AP set, where the N APs are APs in the corresponding fingerprint database whose maximum RSSIs are greater than a preset threshold, N is an integer greater than 1, each sub-area corresponds to one reference AP set, and the M sub-areas correspond to M reference AP sets; comparing a BSSID of an AP received by a terminal device with BSSIDs in the M reference AP sets, to determine a target reference AP set corresponding to a sub-area in which the terminal device is located; and performing positioning calculation based on a fingerprint database corresponding to the target reference AP set, to determine a location of the terminal device.

In this embodiment of this application, an AP that meets a condition in each sub-area is obtained through screening, to generate a reference AP set corresponding to each sub-area, so as to help the terminal device quickly position a sub-area in which the terminal device is currently located, thereby reducing a related calculation amount in a fingerprint positioning process of the terminal device, and improving positioning efficiency.

With reference to the first aspect, in a first possible implementation, after the performing positioning calculation based on a fingerprint database corresponding to the target reference AP set, to determine a location of the terminal device, the location of the terminal device is re-determined, and the re-determining the location of the terminal device includes: selecting a fingerprint database based on a time interval between last positioning and current positioning to perform current positioning calculation.

In this embodiment of this application, after the terminal device performs positioning at least once, in other words, when a "last" positioning record is generated, the terminal device determines, based on continuity of mobility space of the terminal device, a time difference between the two times of positioning, and selects a fingerprint database used to perform current positioning, to further reduce the calculation amount.

With reference to the first possible implementation of the first aspect, in a second possible implementation, the selecting a fingerprint database based on a time interval between last positioning and current positioning to perform current positioning calculation includes: when the time interval between the two times of positioning is less than a preset time threshold, selecting a fingerprint database used in last positioning calculation to perform current positioning calculation.

In this embodiment of this application, when the time difference between the two times of positioning is less than the preset time threshold, the fingerprint database used by the terminal device in the last fingerprint positioning is still used, so that a step in which the terminal device needs to determine a fingerprint database used in the current positioning is omitted, thereby improving positioning efficiency.

With reference to the first possible implementation of the first aspect, or with reference to the second possible implementation of the first aspect, in a third possible implementation, the selecting a fingerprint database based on a time interval between last positioning and current positioning to perform current positioning calculation includes: when the time interval between the two times of positioning is greater than a preset time threshold, selecting a fingerprint database used in last positioning calculation and an associated fingerprint database to perform current positioning calculation, where a sub-area corresponding to the associated fingerprint database is adjacent to a sub-area corresponding to the fingerprint database used in last positioning calculation.

In this embodiment of this application, when the time difference between the two times of positioning is greater than the preset time threshold, not only the fingerprint database used by the terminal device in the last fingerprint positioning is still used, but a fingerprint database corresponding to a sub-area adjacent to the sub-area corresponding to the last positioning is also used, so that the calculation amount can be reduced.

With reference to any one of the first aspect or the implementations of the first aspect, in a fourth possible implementation, the comparing a BSSID of an AP received by a terminal device with BSSIDs in the M reference AP sets, to determine a target reference AP set corresponding to a sub-area in which the terminal device is located includes: determining, as the target reference AP set, a reference AP set in the M reference AP sets that has a maximum quantity of elements in an intersection set with a first AP set, where the first AP set includes the BSSID of the AP currently received by the terminal device.

In this embodiment of this application, the AP currently collected by the terminal device may be compared with APs in the M reference AP sets, and a reference AP set in which an AP is most similar to the AP collected by the terminal device, in other words, a reference AP set with a highest coincidence rate, is used as the target reference AP set corresponding to the sub-area in which the terminal device is currently located, thereby facilitating subsequent selection of a corresponding fingerprint database for fingerprint positioning calculation.

With reference to the first aspect, or with reference to the first possible implementation of the first aspect, or with reference to the second possible implementation of the first aspect, or with reference to the third possible implementation of the first aspect, in a fifth possible implementation, the comparing a BSSID of an AP received by a terminal device with BSSIDs in the M reference AP sets, to determine a target reference AP set corresponding to a sub-area in which the terminal device is located includes: determining, as the target reference AP set, a reference AP set in the M reference AP sets that has a maximum quantity of elements in an intersection set with a second AP set, where the second AP set includes BSSIDs that are currently received by the terminal device and that are of APs whose RSSIs meet a preset condition, the APs whose RSSIs meet the preset condition are APs corresponding to first X RSSIs in RSSIs that are ranked in descending order in a corresponding fingerprint database, and X is a positive number greater than or equal to 1, or the APs whose RSSIs meet the preset condition are APs corresponding to RSSIs in a top preset percentage of RSSIs that are ranked in descending order in a corresponding fingerprint database.

In this embodiment of this application. APs collected by the terminal device are screened, to be specific, only some APs with relatively strong RSSIs in the APs collected by the terminal device are selected and compared with APs in the M reference AP sets, thereby further improving comparison efficiency and accuracy.

In a possible implementation, the method further includes: determining a target sub-area to which a location positioned last time belongs in the M sub-areas; determining a type of the target sub-area, where the type of the target sub-area includes a connected area and a non-connected area, and non-connected areas are connected by the connected area, if the target sub-area is the connected area, determining Y non-connected areas corresponding to the target sub-area, where Y is an integer greater than 1; determining, based on a third AP set, a target reference AP set corresponding to an area in which the terminal device is currently located, where the third AP set includes a BSSID that is currently received by the terminal device and that is of an AP whose RSSI meets the preset condition, the target reference AP set is a set in (Y+1) reference AP sets that has a maximum quantity of elements in an intersection set with the third AP set, and the (Y+1) reference AP sets are separately a reference AP set corresponding to the target sub-area and reference AP sets corresponding to the Y non-connected areas, determining the fingerprint database corresponding to the target reference AP set; and performing positioning calculation based on the fingerprint database corresponding to the target reference AP set, to determine a current location of the terminal device.

In this embodiment of this application, when the sub-area is divided into the connected area and the non-connected area, and it is determined that a last positioning result is the connected area, a sub-area range in which the terminal device is currently located is determined in (Y+1) areas (Y non-connected areas+1 connected area) that are connected to the connected area, and comparison with a large range of reference AP sets does not need to be performed, thereby reducing a positioning calculation amount of the terminal device, and improving positioning efficiency.

In a possible implementation, the method further includes: if the target sub-area is the non-connected area, performing positioning calculation based on the target fingerprint database, to determine a current location of the terminal device in the target sub-area, where the target fingerprint database is a fingerprint database corresponding to the target sub-area.

In this embodiment of this application, when the sub-area is divided into the connected area and the non-connected area, and it is determined that a last positioning result is the non-connected area, a sub-area range in which the terminal device is currently located is determined in the non-connected area, in other words, it is roughly determined that the terminal device temporarily does not move to another non-connected area, comparison with a large range of reference AP sets does not need to be performed, and positioning calculation is performed by directly using the fingerprint database corresponding to the sub-area positioned by the terminal device last time, thereby reducing a positioning calculation amount of the terminal device, and improving positioning efficiency.

In a possible implementation, the method further includes: sending, by a server, a positioning result to the terminal device, where the positioning result includes the current location of the terminal device obtained through positioning calculation.

In this embodiment of this application, a series of related positioning operations are performed on a server side with relatively strong operation and storage capabilities, and finally a positioning calculation result is sent to a terminal device side, thereby reducing the calculation amount of the terminal device, and improve positioning calculation efficiency.

In a possible implementation, the method further includes: receiving, by the server, the BSSID and the corresponding RSSI of the AP that are received by the terminal device and then sent by the terminal device.

In this embodiment of this application, the server receives the BSSID and the RSSI of the collected AP that are sent by the terminal device side, and may perform specific positioning calculation with reference to the determined fingerprint database.

According to a second aspect, an embodiment of this application provides a fingerprint positioning apparatus, and the fingerprint positioning apparatus may include:

a division module, configured to divide a to-be-positioned area into M sub-areas, where each sub-area has a corresponding fingerprint database, the fingerprint database includes a plurality of pieces of fingerprint data, the fingerprint data is a basic service set identifier BSSID and a received signal strength indicator RSSI of a wireless access point AP that are detected at each of a plurality of sampling points in a corresponding sub-area, and M is an integer greater than or equal to 1;

a screening module, configured to: perform screening in the fingerprint database corresponding to each sub-area, and select BSSIDs of N APs in the fingerprint database to constitute a reference AP set, where the N APs are APs in the corresponding fingerprint database whose maximum RSSIs are greater than a preset threshold, N is an integer greater than 1, each sub-area corresponds to one reference AP set, and the M sub-areas correspond to M reference AP sets;

a comparison module, configured to compare a BSSID of an AP received by a terminal device with BSSIDs in the M reference AP sets;

a determining module, configured to determine a target reference AP set corresponding to a sub-area in which the terminal device is located; and a positioning module, configured to perform positioning calculation based on a fingerprint database corresponding to the target reference AP set, to determine a location of the terminal device.

With reference to the second aspect, in a first possible implementation, the apparatus further includes:

a selection module, configured to select a fingerprint database based on a time interval between last positioning and current positioning to perform current positioning calculation.

With reference to the first possible implementation of the second aspect, in a second possible implementation, the selection module is specifically configured to:

when the time interval between the two times of positioning is less than a preset time threshold, select a fingerprint database used in last positioning calculation to perform current positioning calculation.

With reference to the first possible implementation of the second aspect, or with reference to the second possible implementation of the second aspect, in a third possible implementation, the selection module is specifically configured to:

when the time interval between the two times of positioning is greater than a preset time threshold, select a fingerprint database used in last positioning calculation and an associated fingerprint database to perform current positioning calculation, where a sub-area corresponding to the associated fingerprint database is adjacent to a sub-area corresponding to the fingerprint database used in last positioning calculation.

With reference to any one of the second aspect or the implementations of the second aspect, in a fourth possible implementation, the determining module is specifically configured to:

determine, as the target reference AP set, a reference AP set in the M reference AP sets that has a maximum quantity of elements in an intersection set with a first AP set, where the first AP set includes the BSSID of the AP currently received by the terminal device.

With reference to the second aspect, or with reference to the first possible implementation of the second aspect, or with reference to the second possible implementation of the second aspect, or with reference to the third possible implementation of the second aspect, in a fifth possible implementation, the determining module is specifically configured to:

determine, as the target reference AP set, a reference AP set in the M reference AP sets that has a maximum quantity of elements in an intersection set with a second AP set, where the second AP set includes BSSIDs that are currently received by the terminal device and that are of APs whose RSSIs meet a preset condition, the APs whose RSSIs meet the preset condition are APs corresponding to first X RSSIs in RSSIs that are ranked in descending order in a corresponding fingerprint database, and X is a positive number greater than or equal to 1, or the APs whose RSSIs meet the preset condition are APs corresponding to RSSIs in a top preset percentage of RSSIs that are ranked in descending order in a corresponding fingerprint database.

According to a third aspect, an embodiment of this application provides a fingerprint positioning apparatus, and the fingerprint positioning apparatus may include:

a memory, configured to store a program instruction; and a processor, configured to invoke the program instruction stored in the memory to perform the following steps:

dividing a to-be-positioned area into M sub-areas, where each sub-area has a corresponding fingerprint database, the fingerprint database includes a plurality of pieces of fingerprint data, the fingerprint data is a basic service set identifier BSSID and a received signal strength indicator RSSI of a wireless access point AP that are detected at each of a plurality of sampling points in a corresponding sub-area, and M is an integer greater than or equal to 1;

performing screening in the fingerprint database corresponding to each sub-area, and selecting BSSIDs of N APs in the fingerprint database to constitute a reference AP set, where the N APs are APs in the corresponding fingerprint database whose maximum RSSIs are greater than a preset threshold, N is an integer greater than 1, each sub-area corresponds to one reference AP set, and the M sub-areas correspond to M reference AP sets;

comparing a BSSID of an AP received by a terminal device with BSSIDs in the M reference AP sets, to determine a target reference AP set corresponding to a sub-area in which the terminal device is located; and performing positioning calculation based on a fingerprint database corresponding to the target reference AP set, to determine a location of the terminal device.

With reference to the third aspect, in a first possible implementation, the processor is further configured to:

select a fingerprint database based on a time interval between last positioning and current positioning to perform current positioning calculation.

With reference to the first possible implementation of the third aspect, in a second possible implementation, that the processor is further configured to select a fingerprint database based on a time interval between last positioning and current positioning to perform current positioning calculation is specifically:

when the time interval between the two times of positioning is less than a preset time threshold, selecting a fingerprint database used in last positioning calculation to perform current positioning calculation.

With reference to the first possible implementation of the third aspect, or with reference to the second possible implementation of the third aspect, in a third possible implementation, that the processor is further configured to select a fingerprint database based on a time interval between last positioning and current positioning to perform current positioning calculation is specifically:

when the time interval between the two times of positioning is greater than a preset time threshold, selecting a fingerprint database used in last positioning calculation and an associated fingerprint database to perform current positioning calculation, where a sub-area corresponding to the associated fingerprint database is adjacent to a sub-area corresponding to the fingerprint database used in last positioning calculation.

With reference to any one of the third aspect or the implementations of the third aspect, in a fourth possible implementation, that the processor is further configured to compare a BSSID of an AP received by a terminal device with BSSIDs in the M reference AP sets, to determine a target reference AP set corresponding to a sub-area in which the terminal device is located is specifically:

determining, as the target reference AP set, a reference AP set in the M reference AP sets that has a maximum quantity of elements in an intersection set with a first AP set, where the first AP set includes the BSSID of the AP currently received by the terminal device.

With reference to the third aspect, or with reference to the first possible implementation of the third aspect, or with reference to the second possible implementation of the third aspect, or with reference to the third possible implementation of the third aspect, in a fifth possible implementation, that the processor is further configured to compare a BSSID of an AP received by a terminal device with BSSIDs in the M reference AP sets, to determine a target reference AP set corresponding to a sub-area in which the terminal device is located is specifically:

determining, as the target reference AP set, a reference AP set in the M reference AP sets that has a maximum quantity of elements in an intersection set with a second AP set, where the second AP set includes BSSIDs that are currently received by the terminal device and that are of APs whose RSSIs meet a preset condition, the APs whose RSSIs meet the preset condition are APs corresponding to first X RSSIs in RSSIs that are ranked in descending order in a corresponding fingerprint database, and X is a positive number greater than or equal to 1, or the APs whose RSSIs meet the preset condition are APs corresponding to RSSIs in a top preset percentage of RSSIs that are ranked in descending order in a corresponding fingerprint database.

According to a fourth aspect, this application provides a fingerprint positioning server, where the fingerprint positioning server includes a processor, and the processor is configured to support the fingerprint positioning server in executing a corresponding function in the fingerprint positioning method provided in the first aspect. The fingerprint positioning server may further include a memory. The memory is configured to be coupled to the processor, and the memory stores a program instruction and data that are necessary for the fingerprint positioning server. The fingerprint positioning server may further include a communications interface used by the fingerprint positioning server to communicate with another device or communications network.

According to a fifth aspect, this application provides a computer-readable storage medium, and the computer-readable storage medium stores an instruction. When the instruction is run on a computer, the computer is enabled to perform the methods in the foregoing aspects.

According to a sixth aspect, an embodiment of this application provides a computer program product that includes an instruction. When the instruction is run on a computer, the computer is enabled to perform the methods in the foregoing aspects.

Beneficial effects of the embodiments of this application are as follows:

In this embodiment of this application, the to-be-positioned area is divided into the M sub-areas, screening is performed in the fingerprint database corresponding to each sub-area, and the BSSIDs of the N APs in the fingerprint database are selected to constitute the reference AP set. Then the BSSID of the AP received by the terminal device is compared with the BSSIDs in the M reference AP sets, to determine the target reference AP set corresponding to the sub-area in which the terminal device is located. Finally, positioning calculation is performed based on the fingerprint database corresponding to the target reference AP set, to determine the location of the terminal device. The reference AP set is an AP set that is generated after an AP with relatively weak signal strength (with no reference significance) in an entire sub-area is excluded from a fingerprint database corresponding to the sub-area through screening. Therefore, an AP in the reference AP set can better represent a feature of the sub-area. In this way, when the terminal device needs to perform positioning, the terminal device does not need to compare the AP received by the terminal device with all APs in the fingerprint database corresponding to the sub-area, but only needs to compare the AP received by the terminal device with a reference AP that is in the fingerprint database and that can better represent the sub-area, so that the sub-area in which the terminal device is currently located can be quickly determined. Subsequently, the fingerprint database of the corresponding sub-area is invoked to perform accurate positioning calculation, thereby greatly reducing a calculation amount of the positioning operation, and improving positioning efficiency and accuracy.

DESCRIPTION OF EMBODIMENTS

Figure 1:
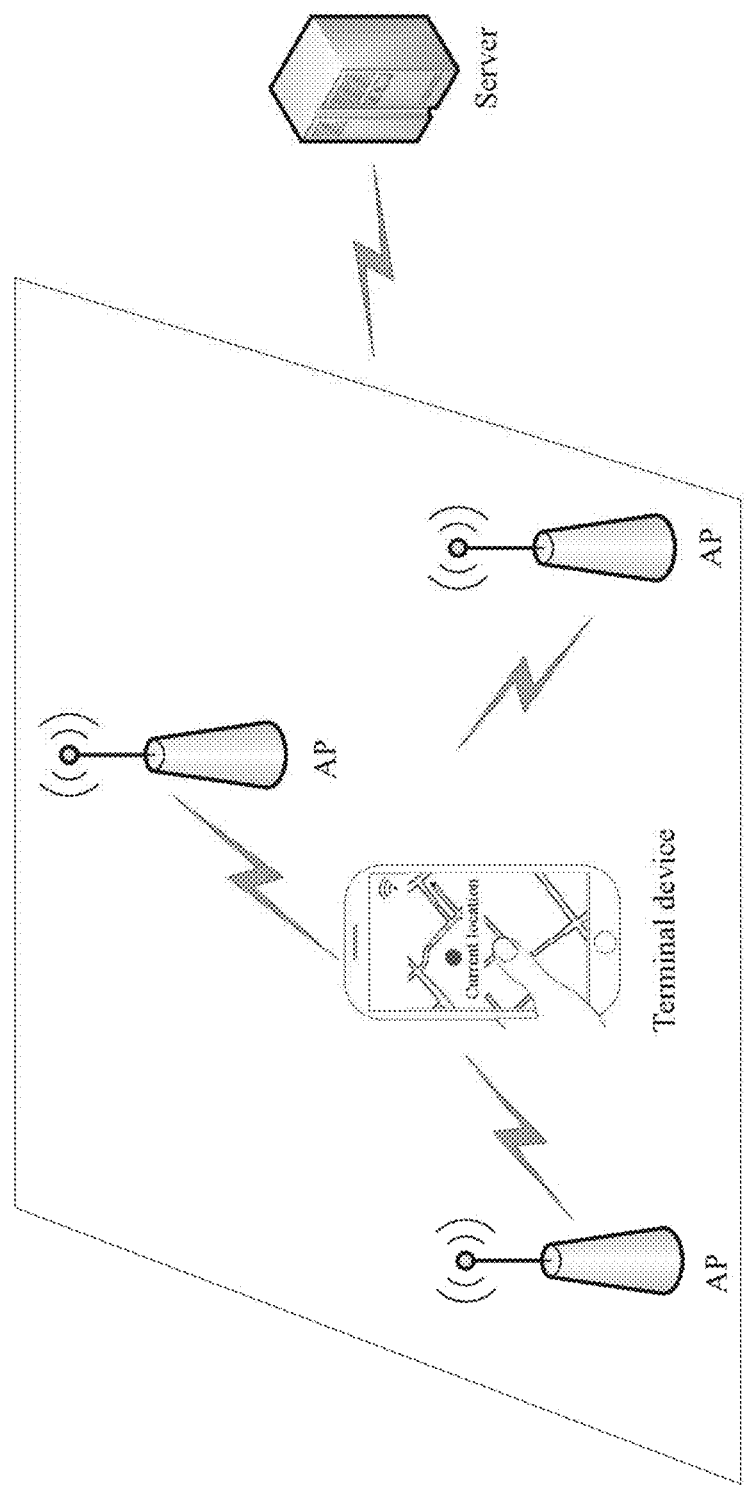
FIG. 1 is an architectural diagram of a fingerprint positioning system according to an embodiment of this application.

The following describes the embodiments of this application with reference to the accompanying drawings in the embodiments of this application.

In the specification, claims, and accompanying drawings of this application, the terms "first", "second", "third", "fourth", and the like are intended to distinguish between different objects but do not indicate a particular order. In addition, the terms "including" and "having" and any other variants thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in this specification means that a particular characteristic, structure, or feature described with reference to the embodiment may be included in at least one embodiment of this application. The phrase appearing in various locations in this specification may not necessarily refer to a same embodiment, and is not an independent or optional embodiment exclusive from another embodiment. It is explicitly and implicitly understood by persons skilled in the art that the embodiments described in this specification may be combined with another embodiment.

In the following, some terms in this application are described, to help persons skilled in the art have a better understanding.

(1) A terminal device may be user equipment (User Equipment, UE), for example, a handheld device or an in-vehicle device that has a wireless connection function. Common terminal devices include, for example, a mobile phone, a tablet computer, a notebook computer, a palmtop computer, a mobile internet device (Mobile Internet Device, MID), a wearable device, a smart band, a pedometer, an MP3 (Moving Picture Experts Group Audio Layer III, moving picture experts group audio layer 3) player, an MP4 (Moving Picture Experts Group Audio Layer IV, moving picture experts group audio layer 3) player, a personal digital assistant (Personal Digital Assistant, PDA), and a laptop computer.

(2) A basic service set identifier (Basic Service Set Identifier, BSSID) is a special Ad-hoc LAN application, and is also referred to as a basic service set (BSS). A BSSID is assigned to each BSS, and the BSSID is a 48-bit binary identifier used to identify different BSSs.

(3) "A plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following describes the embodiments of this application with reference to the accompanying drawings.

To facilitate understanding of the embodiments of this application, the following first describes a fingerprint positioning system architecture on which the embodiments of this application are based. FIG. 1 is an architectural diagram of a fingerprint positioning system according to an embodiment of this application. The system architecture includes a plurality of access point APs, a server, and a terminal device that needs to perform fingerprint positioning in an area.

The AP in this application is a wireless AP that has a Wi-Fi function. Each AP has a globally unique MAC address BSSID, and usually does not move within a time period. In a phase of collecting and forming a fingerprint database and in a phase in which a terminal device uses the fingerprint database to perform matching and positioning, the AP is used to enable, by using a BSSID of an AP broadcast in a sent Wi-Fi broadcast frame (for example, a beacon frame) and a received signal strength indicator RSSI that is calculated when the Wi-Fi broadcast frame is received by the terminal device, a sampling terminal device to collect a fingerprint database at a sampling point based on the BSSID and the corresponding RSSI, and may further enable a positioning terminal device to perform positioning based on a currently received beacon frame. It should be noted that the AP in this application has a positioning function, and may also provide a Wi-Fi network for a terminal device connected to the AP.

The server in this application may have a fingerprint database generation function, a storage function, and a fingerprint positioning calculation function, and may further include another related service function. The server receives sampling performed by the sampling terminal device at each sampling point, and performs a series of sampled data processing (filtering, averaging, and the like) on an obtained sampling point location and an obtained BSSID and RSSI of the AP, to generate a total fingerprint database of a positioning area. In addition, the server in this application further divides the positioning area into sub-areas, and generates a reference AP set (an AP set of APs whose maximum RSSIs are greater than a preset threshold in the sub-area) of the sub-area obtained through division and a corresponding fingerprint database. After receiving a positioning request of the terminal device and a BSSID and an RSSI of an AP fed back by the terminal device, the server first compares the AP fed back by the terminal device with the reference AP set, to find a reference AP set with highest similarity, and then performs positioning in a sub-area corresponding to the reference AP set with the highest similarity. In this way, in a positioning process, the terminal device more quickly and more accurately positions a sub-area with a smaller range, and further performs accurate positioning in the determined sub-area. Finally, the server feeds back a positioning result to the terminal device. Therefore, a fingerprint positioning process of the terminal device is completed. For a more detailed principle and step, refer to descriptions of subsequent embodiments. It may be understood that the server in this embodiment of this application may continuously update and supplement a total fingerprint database of the server, to ensure accuracy of a fingerprint database of each sub-area.

The terminal device in this application has a Wi-Fi signal receiving function, and may perform fingerprint positioning based on a BSSID of an AP that is sent by each surrounding AP and that is obtained in real time, an RSSI of a received Wi-Fi signal that is obtained by parsing the signal, a reference AP set provided by the server, and a corresponding fingerprint database. It should be noted that the terminal device in this application may complete fingerprint positioning in a process of interacting with the server in real time, or may download offline, in advance in a specific manner, a related fingerprint database stored in the server to the terminal device, and then perform positioning calculation by using a positioning application installed on the terminal device. This is not specifically limited in this application. Certainly, offline downloading of the related fingerprint database also needs to be updated periodically or occasionally based on an actual status, to improve positioning accuracy.

It may be understood that the fingerprint positioning system architecture in FIG. 1 is only an example implementation in the embodiments of this application. The fingerprint positioning system architecture in the embodiments of this application includes but is not limited to the foregoing system architecture.

Figure 2:
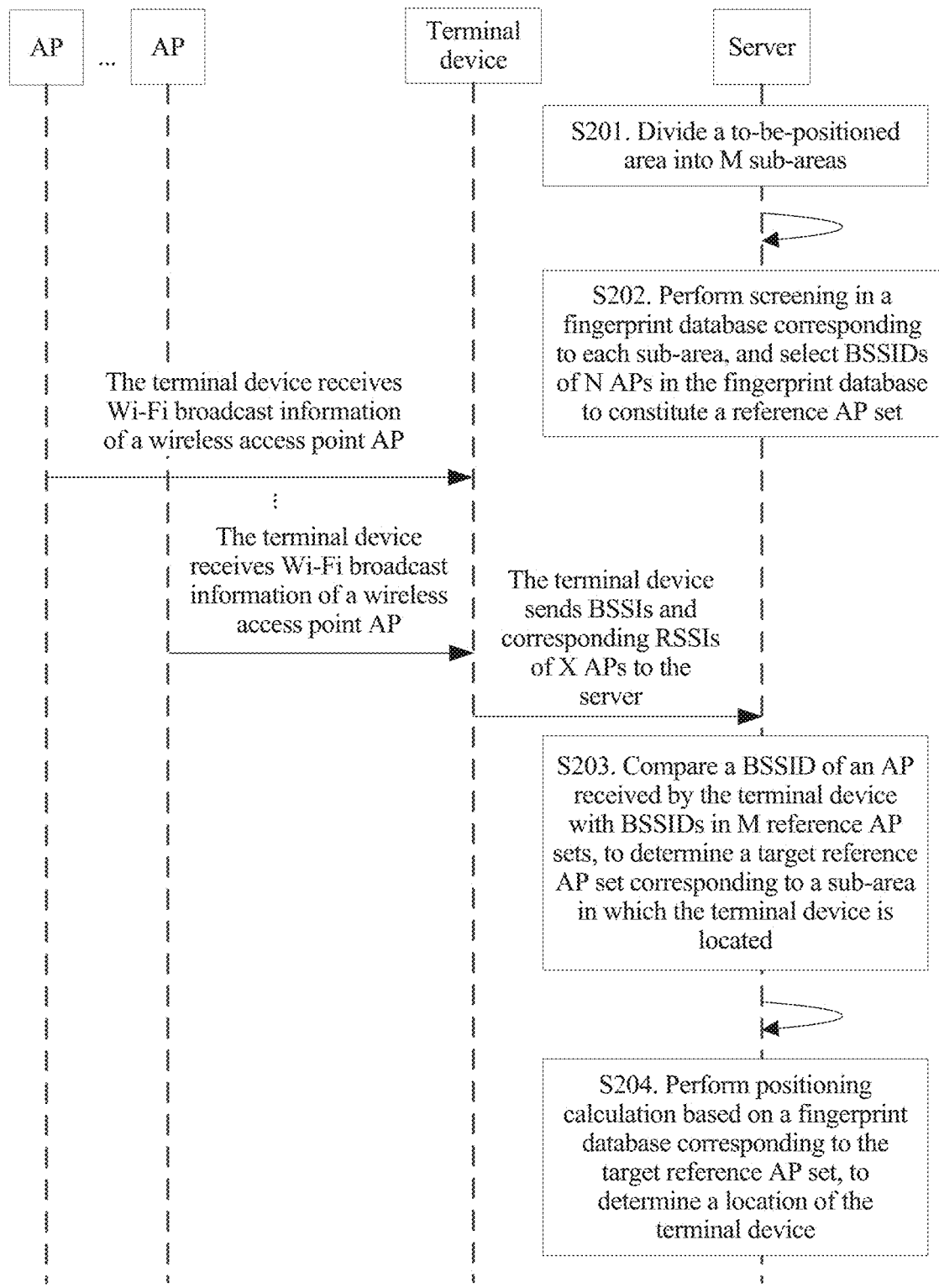
FIG. 2 is a schematic flowchart of a fingerprint positioning method according to an embodiment of this application.

FIG. 2 is a schematic flowchart of a fingerprint positioning method according to an embodiment of this application. The fingerprint positioning method in this embodiment of this application is described below from interaction sides of an AP, a terminal device, and a server with reference to FIG. 2 and based on the fingerprint positioning system architecture in FIG. 1. It should be noted that, to describe the fingerprint positioning method in this embodiment of this application in more detail, a corresponding execution body is described as a server or a terminal device in each procedure step of this application, but this does not indicate that a corresponding method procedure can be executed only by the described execution body in this embodiment of this application.

Step S201: The server divides a to-be-positioned area into M sub-areas.

Specifically, the server divides the to-be-positioned area into the M sub-areas, where M is an integer greater than or equal to 1. An area division rule may be that division is performed based on a difference in a function, a layout, a building structure, or the like of the to-be-positioned area. This is not specifically limited in this application. Each sub-area of the to-be-positioned area has a corresponding fingerprint database, and each corresponding fingerprint database includes a plurality of pieces of fingerprint data. The fingerprint data is a basic service set identifier BSSID and a received signal strength indicator RSSI of an AP that are detected at each of a plurality of sampling points in a corresponding sub-area. To be specific, the fingerprint database includes BSSIDs and corresponding RSSIs that are of APs and that are obtained through performing measurement at a large quantity of different sampling points one by one in the corresponding sub-area. It should be noted that the fingerprint database may be understood as a pre-drawn signal map Map, and corresponding fingerprint databases are created for different sub-areas. When performing positioning, the terminal device first needs to determine a sub-area in which the terminal device is located, and then invokes a corresponding fingerprint database to perform positioning calculation. For example, in an actual application scenario, for example, a common indoor positioning service site such as a supermarket, an office building, or a garage, a positioning service coverage area of the indoor positioning service site usually includes a plurality of sub-areas that are separated in terms of space, for example, different floors or different areas in a same floor. Therefore, to cover an entire positioning area, a corresponding fingerprint database needs to be created for each sub-area.

It should be further explained that the fingerprint database includes the plurality of pieces of fingerprint data, and each piece of fingerprint data represents a wireless signal fingerprint at a sampling point in the positioning area. Specifically, one piece of fingerprint data includes two parts: location coordinates and a wireless signal fingerprint. The location coordinates represent coordinates of the sampling point in a coordinate system constituted by an entire indoor environment, and the wireless signal fingerprint includes a BSSID and an RSSI of an AP corresponding to at least one AP signal that can be received at a location of the sampling point. Certainly, quantities of AP signals that can be received at different sampling points may not necessarily be the same. In a specific positioning sub-area, a deployment location of each AP is determined. For any specific sampling point, distances between the sampling point and deployment locations of different APs are definitely different. Generally, for an AP close to the sampling point, an RSSI of a received AP signal is large, and for an AP far away from the sampling point, an RSSI of a received AP signal is small. Some APs are very far away from the sampling point, or there is a barrier such as a wall between the AP and the sampling point, and therefore a signal of the AP cannot be received at the sampling point. Therefore, theoretically, wireless signal fingerprints at different sampling points are unique. This means that a mapping relationship between location coordinates and a wireless signal fingerprint is established. In a positioning calculation process, when receiving positioning fingerprint data at a location, the server compares the positioning fingerprint with each fingerprint in the fingerprint database, to calculate similarity. Higher similarity indicates that the positioning fingerprint is more "similar" to the fingerprint data, and indicates that location coordinates corresponding to the fingerprint data are closer to a location of a user, and in this way, the location of the user is calculated.

Step S202: The server performs screening in a fingerprint database corresponding to each sub-area, and selects BSSIDs of N APs in the fingerprint database to constitute a reference AP set.

Specifically, each sub-area in this application corresponds to one reference AP set. Therefore, the M sub-areas correspond to M reference AP sets. The reference AP set includes the BSSIDs of the N APs in the fingerprint database corresponding to the sub-area corresponding to the reference AP set. The N APs are specifically APs in the corresponding fingerprint database whose maximum RSSIs are greater than a preset threshold, and N is an integer greater than 1. Generally, in other words, the server calculates and generates reference AP sets with "positioning reference significance" that respectively correspond to a plurality of sub-areas obtained through division in a to-be-positioned area. The "positioning reference significance" mainly is some APs that are obtained through screening based on a signal strength indicator size. To be specific, a BSSID of an AP whose RSSI is too small is excluded, and only a BSSID of an AP whose RSSI is relatively large is remained, to generate a reference AP set that can better represent a feature of a sub-area.

A reason why the N selected APs are the APs in the corresponding fingerprint database whose maximum RSSIs are greater than the preset threshold is as follows: Each sub-area corresponds to one fingerprint database, and the fingerprint database corresponding to each sub-area includes all APs that can be sampled and received by the terminal device at all sampling points in the sub-area; therefore if maximum RSSI values of an AP in a sub-area at all sampling points in the sub-area are less than the preset threshold, it indicates that the AP has very weak signal strength at all the sampling points in the sub-area, and it may be further determined that the AP does not belong to the sub-area in terms of a geographical location or a spatial location, and may be an AP from a "neighboring" sub-area of a neighboring wall or a neighboring floor. In this way, an RSSI of this AP essentially does not play a significant role in determining whether the terminal device is located in the sub-area, and may even "cause confusion" to some extent, and consequently reduce positioning recognition efficiency. Therefore, the server in this application needs to perform screening processing in fingerprint databases respectively corresponding to the M sub-areas, to obtain, through screening, APs that can better represent features of the sub-areas, to constitute the reference AP set.

A specific method for obtaining reference APs through screening may be as follows: First, all APs appearing in a corresponding fingerprint database are extracted from the fingerprint database, and RSSIs of each AP at all sampling points in the fingerprint database are correspondingly extracted, and then a maximum RSSI of each AP in the fingerprint database is determined. If a maximum RSSI of an AP in a sub-area is less than the preset threshold, it may be determined that the AP has no reference significance to the sub-area. On the contrary, an AP whose maximum RSSI is greater than the preset threshold may be determined as one of the N APs. It may be understood that quantities N of APs in reference AP sets corresponding to different sub-areas are different, in other words, values of N for different reference AP sets in this application are obtained through performing specific calculation by using corresponding fingerprint databases, and may be the same or may be different.

It should be emphasized and noted that step S201 and step S202 need to be performed only when the to-be-positioned area is initially divided. Once the to-be-positioned area is divided, and a reference AP set of a corresponding sub-area is determined, step S201 and step S202 do not need to be repeatedly performed in a subsequent positioning calculation process, in other words, subsequent step S203 and step S204 may be directly performed. Certainly, if the to-be-positioned area needs to be re-divided into sub-areas due to a reason such as building reconstruction or a layout change, step S203 and step S204 still need to be performed.

Step 203: The server compares a BSSID of an AP received by the terminal device with BSSIDs in the M reference AP sets, to determine a target reference AP set corresponding to a sub-area in which the terminal device is located.

Specifically, the BSSID of the AP currently received by the terminal device is compared with the BSSIDs in the M reference AP sets determined in step S202, to finally determine the target reference AP set corresponding to the sub-area in which the terminal device is located. Generally, the server performs basis calculation for fingerprint positioning of the terminal device based on the previously determined M reference AP sets of the to-be-positioned area, and preliminarily determines, by determining the target reference AP set corresponding to the area in which the terminal device is currently located, a sub-area in which the terminal device is relatively likely to be located, so that more accurate positioning is subsequently performed in the sub-area without a need to perform fingerprint comparison with a fingerprint database of another sub-area in which the terminal device is less likely to be located, thereby avoiding unnecessary fingerprint positioning calculation.

In a possible implementation, a reference AP set in the M reference AP sets that has a maximum quantity of elements in an intersection set with a first AP set is determined as the target reference AP set, and the first AP set includes the BSSID of the AP currently received by the terminal device. Generally, the server compares BSSIDs of APs in the first AP set with the BSSIDs of the APs in the M reference AP sets determined by the server, and selects a reference AP set with highest similarity as the target reference AP set. Similarity may be specifically determined based on a quantity of elements in an intersection set between sets. A larger quantity of elements in the intersection set indicates a larger quantity of same elements between two sets, in other words, indicates higher similarity between the sets. To be specific, it indicates that an area (an area corresponding to the first AP set) in which the terminal device is currently located and a sub-area corresponding to the target reference AP set may be a same area. Therefore, the sub-area corresponding to the target reference AP set determined by the terminal device is determined as the area in which the terminal device is currently located.

In a possible implementation, a reference AP set in the M reference AP sets that has a maximum quantity of elements in an intersection set with a second AP set is determined as the target reference AP set. The second AP set includes BSSIDs that are currently received by the terminal device and that are of APs whose RSSIs meet a preset condition, the APs whose RSSIs meet the preset condition are APs corresponding to first X RSSIs in RSSIs that are ranked in descending order in a corresponding fingerprint database, and X is a positive number greater than or equal to 1, or the APs whose RSSIs meet the preset condition are APs corresponding to RSSIs in a top preset percentage of RSSIs that are ranked in descending order in a corresponding fingerprint database. Specifically, the server screens BSSIDs of APs received by the terminal device, to be specific, does not use all the received BSSIDs of the APs as comparison objects, and selects BSSIDs of only some APs whose RSSIs are relatively large to be compared with the BSSIDs in the M reference AP sets, thereby improving comparison efficiency. It may be understood that if there are a plurality of reference AP sets that meet a condition, there may be one or more target reference AP sets. This application sets no specific limitation on a quantity of finally determined target reference AP sets.

It may be understood that in this embodiment of this application, the following method steps may be further included: A plurality of APs broadcast Wi-Fi broadcast information; and the terminal device receives the Wi-Fi broadcast information sent by the APs.

Specifically, the Wi-Fi broadcast information broadcast by the APs includes BSSIDs of the APs, to be specific, the BSSIDs of the APs currently received by the terminal device are essentially obtained by the terminal device from the received Wi-Fi broadcast information broadcast by the APs, and corresponding RSSIs are also calculated based on the received Wi-Fi broadcast information.

Step S204: The server performs positioning calculation based on a fingerprint database corresponding to the target reference AP set, to determine a location of the terminal device.

Specifically, after determining the target reference AP set corresponding to the area in which the terminal device is currently located, the server may determine, based on the target reference AP set, the sub-area corresponding to the target reference AP set and the fingerprint database corresponding to the sub-area, so that fingerprint comparison for positioning needs to be performed during subsequent accurate positioning. Specifically, in a positioning calculation process, fingerprint data collected by the terminal device needs to be used, to be specific, a BSSID and a corresponding RSSI of an AP collected by the terminal device.

It should be noted that a target reference AP set determining process and a positioning calculation and derivation process may be performed on the server described above, or may be performed on the terminal device. To be specific, when determining the first AP set or the second AP set corresponding to the terminal device, the terminal device obtains the M reference AP sets from a server side, and calculates and determines, on a terminal device side, the target reference AP set that matches the first AP set or the second AP set. To be specific, this application sets no specific limitation on a specific execution body of all or some steps in the fingerprint positioning calculation process. All the steps may be performed by the server, or may be performed by the terminal device, or may be interactively performed by the server and the terminal device, provided that a corresponding result can be finally determined.

Optionally, the server further receives the BSSID and the corresponding RSSI of the AP that are received by the terminal device and then sent by the terminal device, to perform specific positioning calculation with reference to a finally determined fingerprint database.

Optionally, after determining a current location of the terminal device through positioning calculation, the server may send a positioning result to the terminal device, to meet a positioning requirement of a user who uses the terminal device.

Figure 3:
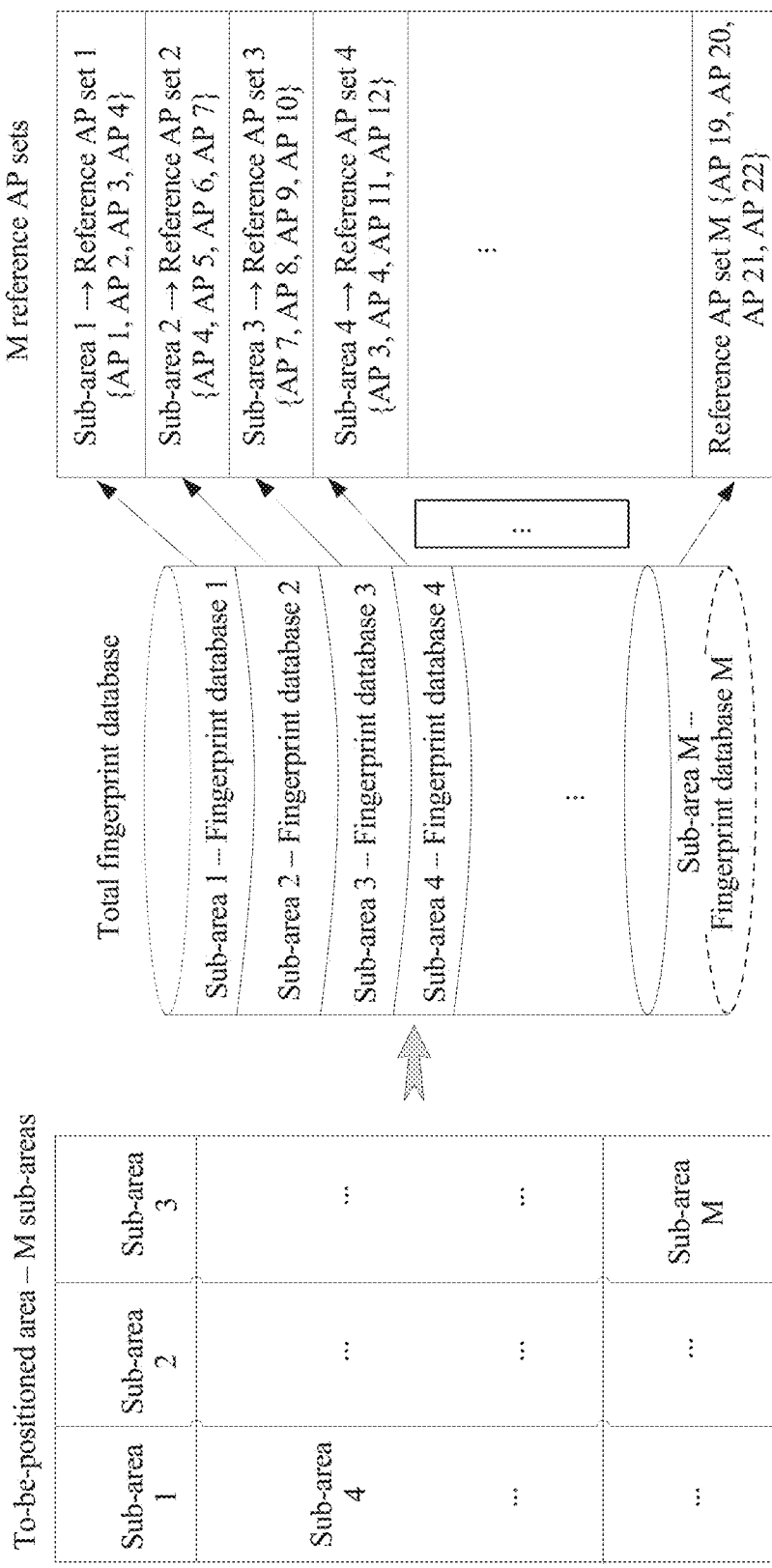
FIG. 3 is a schematic diagram of a specific application scenario of a fingerprint positioning method according to an embodiment of this application.

In a specific application scenario, FIG. 3 is a schematic diagram of a specific application scenario of a fingerprint positioning method according to an embodiment of this application. In FIG. 3, a to-be-positioned area is divided into M sub-areas, each sub-area has a corresponding fingerprint database, and a plurality of fingerprint databases constitute a total fingerprint database, namely, the total fingerprint database of the to-be-positioned area. A corresponding reference AP set is generated for each fingerprint database, namely, a reference AP set corresponding to each of the M sub-areas. The reference AP set includes a BSSID (or an identifier, a MAC address, or the like of an AP) of an AP with higher reference significance for a corresponding sub-area.

In this embodiment of this application, the server divides the to-be-positioned area into a plurality of sub-areas, determines a fingerprint database corresponding to each sub-area, and then generates, based on each fingerprint database, a reference AP set corresponding to each sub-area. The reference AP set is an AP set that is formed after an AP with relatively weak signal strength (with no reference significance) in an entire sub-area is excluded from a fingerprint database corresponding to the sub-area through screening. Therefore, an AP in the reference AP set can better represent a feature of the sub-area. In this way, when the terminal device needs to perform positioning, the terminal device does not need to perform comparison with all APs appearing in the fingerprint database corresponding to the sub-area, but only needs to perform comparison with the AP that is in the fingerprint database and that can better represent the sub-area, so that the sub-area in which the terminal device is currently located can be quickly determined. Subsequently, the fingerprint database of the corresponding sub-area is invoked to perform accurate positioning calculation, thereby greatly reducing a calculation amount of a positioning operation, and improving positioning efficiency and accuracy.

Figure 4:
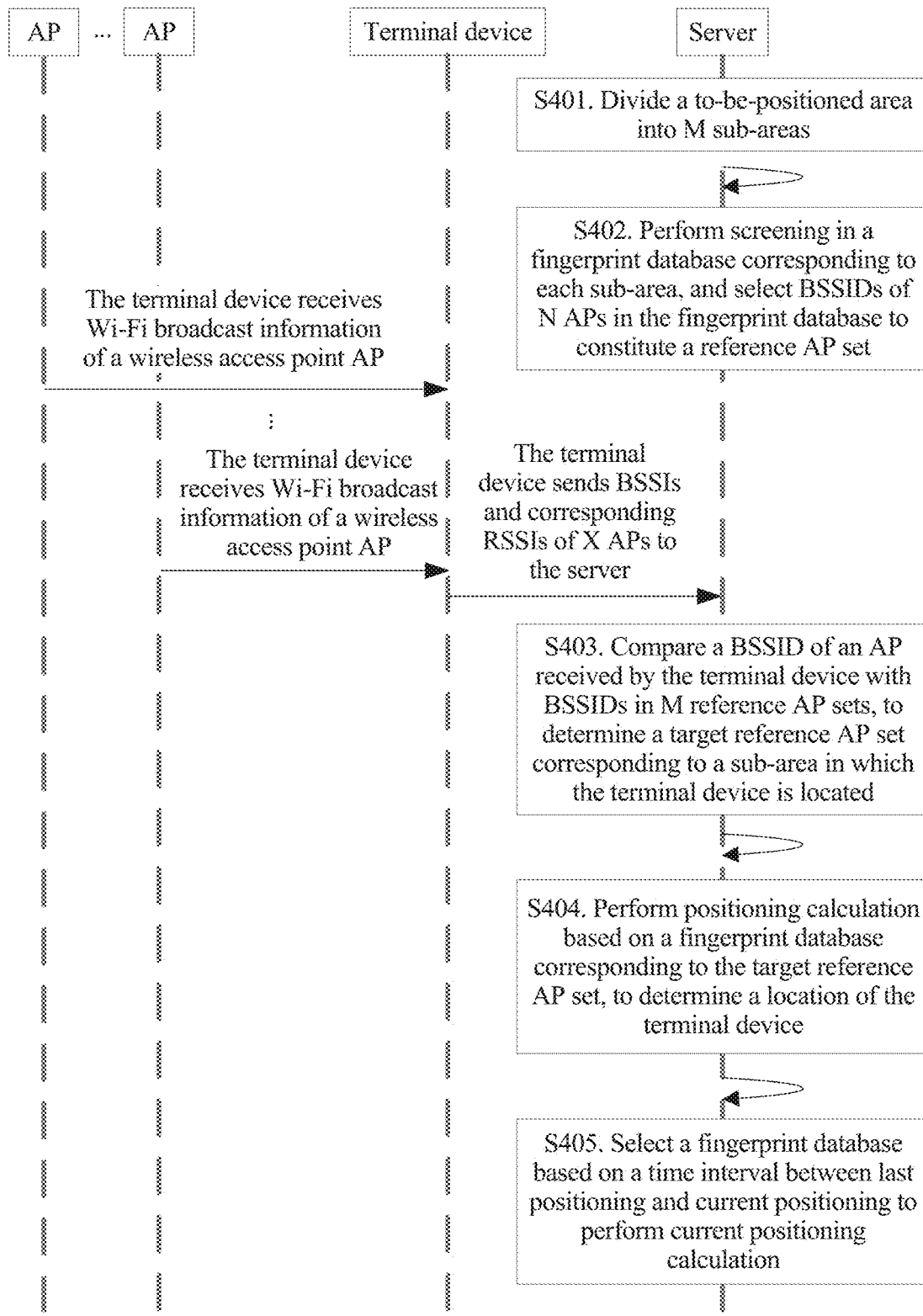
FIG. 4 is a schematic flowchart of another fingerprint positioning method according to an embodiment of this application.

FIG. 4 is a schematic flowchart of another fingerprint positioning method according to an embodiment of this application. The fingerprint positioning method in this embodiment of this application is described in detail below from interaction sides of an AP, a terminal device, and a server with reference to FIG. 4 and based on the fingerprint positioning system architecture in FIG. 1.

Specifically, for step S401 to step S404, refer to step S201 to step S204 in the embodiment shown in FIG. 2. Details are not described herein again.

Step S405: The server selects a fingerprint database based on a time interval between last positioning and current positioning to perform current positioning calculation.

Specifically, after the server performs positioning calculation based on the fingerprint database corresponding to the target reference AP set, and determines the location of the terminal device, the server re-determines the location of the terminal device. "Re-determining" herein may be understood as a re-positioning calculation process that is generated because of a real-time positioning update requirement or a re-positioning request initiated by a user. It should be noted that the foregoing embodiment corresponding to FIG. 2 may be a positioning process that needs to be performed when the terminal device enters the to-be-positioned area for a first time, or enables a fingerprint positioning service for a first time after the terminal device enters the to-be-positioned area within a specific time period. When the terminal device just enters an area or enables the positioning service for the first time, the server currently cannot obtain related historical positioning information, and cannot determine an approximate area in which the terminal device is currently located. Therefore, a matched reference AP set can be found only after complete traversal and comparison are performed between the first AP set or the second AP set of the terminal device and reference AP sets corresponding to all sub-areas in the entire to-be-positioned area. However, because of space continuity and mobility continuity, in a time period after the terminal device enters the to-be-positioned area, if indoor fingerprint positioning is performed at least once, there is historical positioning data. To be specific, when re-determining the current location of the terminal device, the server can determine an approximate range of the current location of the terminal device based on historical data of last positioning without a need to perform traversal and comparison with reference AP sets (to be specific, the M reference AP sets) of all sub-areas, and then perform accurate positioning calculation within the determined range. In this way, a large amount of redundancy calculation can be further reduced, positioning efficiency can be improved, and computing resources can be saved.

Therefore, in this application, when the terminal device has a "last positioning record", the server may select, based on the time interval between the two times of positioning, the fingerprint database used to perform current positioning calculation. Specifically, the following two implementations may be included.

In a first implementation, when the time interval between the two times of positioning is less than a preset time threshold, a fingerprint database used in last positioning calculation is selected to perform current positioning calculation. To be specific, if the time interval between the two times of positioning is very small, it may be considered that the terminal device temporarily does not move out of a sub-area corresponding to the last positioning, and the fingerprint database used in the last positioning calculation may be directly used in current positioning. For example, the current positioning may be performed based on the sub-area to which the current location of the terminal device belongs and that is determined in step S401 to step S404, to avoid a process of re-determining the target reference AP set and the corresponding fingerprint database, thereby further improving positioning efficiency and accuracy.

In a second implementation, when the time interval between the two times of positioning is greater than a preset time threshold, a fingerprint database used in last positioning calculation and an associated fingerprint database are selected to perform current positioning calculation, where a sub-area corresponding to the associated fingerprint database is adjacent to a sub-area corresponding to the fingerprint database used in last positioning calculation. To be specific, if the time interval between the two times of positioning is relatively long, it is considered that the terminal device may still not move out of a sub-area corresponding to the last positioning, or may move to a sub-area adjacent to the sub-area corresponding to the last positioning. Therefore, positioning calculation may be directly performed by using the fingerprint database of the sub-area corresponding to the last positioning and the fingerprint database of the surrounding sub-area adjacent to the sub-area corresponding to the last positioning, to avoid a process of re-determining the target reference AP set and the corresponding fingerprint database, thereby further improving positioning efficiency and accuracy.

It may be understood that if it is finally found, through the fingerprint positioning calculation performed in the foregoing first implementation or second implementation, that the BSSID and the corresponding RSSI of the AP that are currently received by the terminal device cannot match a corresponding fingerprint database, in other words, a positioning error occurs, it indicates that the terminal device may be far away from the sub-area corresponding to the last positioning and the sub-area adjacent to the sub-area corresponding to the last positioning. In this case, the target reference AP set needs to be re-selected based on step S403 and step S404, and this may be understood as positioning error correction.

In a possible implementation, based on the foregoing first implementation or second implementation, more specific determining may be further performed when it is determined that the time interval between the two times of positioning is greater than or less than the preset time threshold, to be specific, a specific type of the sub-area corresponding to the last positioning is determined, and then the fingerprint database used to perform the current positioning calculation is selected based on the determined specific type. Certainly, the foregoing determining manner may alternatively not be based on the foregoing first implementation or second implementation, and may specifically include the following steps a to g.

a. The server determines a target sub-area to which a location positioned last time belongs in the M sub-areas.

Specifically, the target sub-area to which the location positioned last time belongs and that is obtained through positioning calculation in this step may be a result of positioning performed by the terminal device for a first time, namely, the positioned location determined in step S401 to step S404, or may be a location calculated in a step before step S405 and after step S404, to be specific, may be a positioned location that is obtained after a first time of positioning after the terminal device enters the to-be-positioned area, or may be a positioned location that is obtained after a second time of positioning, a third time of positioning, a fourth time of positioning, or subsequent infinite times of positioning after the terminal device enters the to-be-positioned area. This is not specifically limited in this application. In conclusion, the positioned location may be a positioning calculation result in step S404, or may be a positioning calculation result after step S404.

b. The server determines a type of the target sub-area, where the type of the target sub-area includes a connected area and a non-connected area, and non-connected areas are connected by the connected area.

Specifically, in this application, a type of a sub-area is divided into the connected area and the non-connected area. The connected area is an area connecting the non-connected areas, for example, a corridor between two activity areas, an elevator or an escalator between two floors, and a connecting corridor between two shopping malls. To be specific, entering one non-connected area from another non-connected area needs to pass through a connected area connecting the two non-connected areas. It may be understood that the connected areas or the non-connected areas are relative rather than absolute.

c. If the target sub-area is the connected area, the server determines Y non-connected areas corresponding to the target sub-area, where Y is an integer greater than 1.

Specifically, if the target sub-area corresponding to the last positioning that is determined in step b is the connected area, in consideration of mobility continuity and positioning real-time, it indicates that the current terminal device passes through the connected area a short time ago, and there are only two possibilities at present: One possibility is that the terminal device is still in the connected area, and the other possibility is that the terminal device moves from the connected area to several fixed non-connected areas connected to the connected area.

d. The server determines, based on a third AP set, the target reference AP set corresponding to the area in which the terminal device is currently located.

Specifically, the third AP set includes a BSSID of an AP currently received by the terminal device, the third AP set includes a BSSID that is currently received by the terminal device and that is of an AP whose RSSI meets the preset condition. The target reference AP set is a set in (Y+1) reference AP sets that has a maximum quantity of elements in an intersection set with the third AP set, and the (Y+1) reference AP sets are separately a reference AP set corresponding to the target sub-area and reference AP sets corresponding to the Y non-connected areas. The preset condition is the preset condition mentioned in the embodiment corresponding to FIG. 2. Details are not described herein again. In this step, positioning is performed when there is a positioning history record. Therefore, the target reference AP set may be obtained only by comparing quantities of elements in intersection sets between the third AP set and the (Y+1) reference AP sets that are corresponding to the target sub-area and the Y non-connected areas, without a need to perform comparison with all the reference AP sets (to be specific, the M reference AP sets), thereby reducing a calculation amount and improving positioning efficiency.

It should be noted that the second AP set and the third AP set in this application may be the same or may be different.

e. The server determines the fingerprint database corresponding to the target reference AP set.

f. The server performs positioning calculation based on the fingerprint database corresponding to the target reference AP set, to determine a current location of the terminal device.

g. If the target sub-area is the non-connected area, perform positioning calculation based on the target fingerprint database, to determine a current location of the terminal device in the target sub-area, where the target fingerprint database is a fingerprint database corresponding to the target sub-area.

Specifically, if the server determines that the target sub-area corresponding to the last positioning is the non-connected area, it indicates that the terminal device does not pass through the connected area within a short time because when moving one non-connected area to another non-connected area, the terminal device needs to pass through a connected area between the two non-connected areas. Therefore, it may be determined that the terminal device does not move out of the target sub-area and is still in the to-be-positioned area. Therefore, positioning calculation needs to be performed only based on the fingerprint database corresponding to the target sub-area corresponding to the last positioning of the terminal device, thereby further reducing a calculation amount and improving positioning efficiency.

It should be noted that the connected area may not necessarily connect only two areas, and may alternatively connect a plurality of areas. This is determined based on an actual status of the positioning area, and is not specifically limited in this application.

It should be further noted that, this application is described by using an example in which a server is an execution body, but it may be understood that all action procedures performed by the server may be performed by a terminal device side, or may be interactively performed by a server side and a terminal device side. This is not specifically limited in this application provided that a fingerprint positioning solution using the fingerprint positioning method in this application falls within the scope of coverage and protection of this application, and an end that performs an action is not limited.

Figure 5:
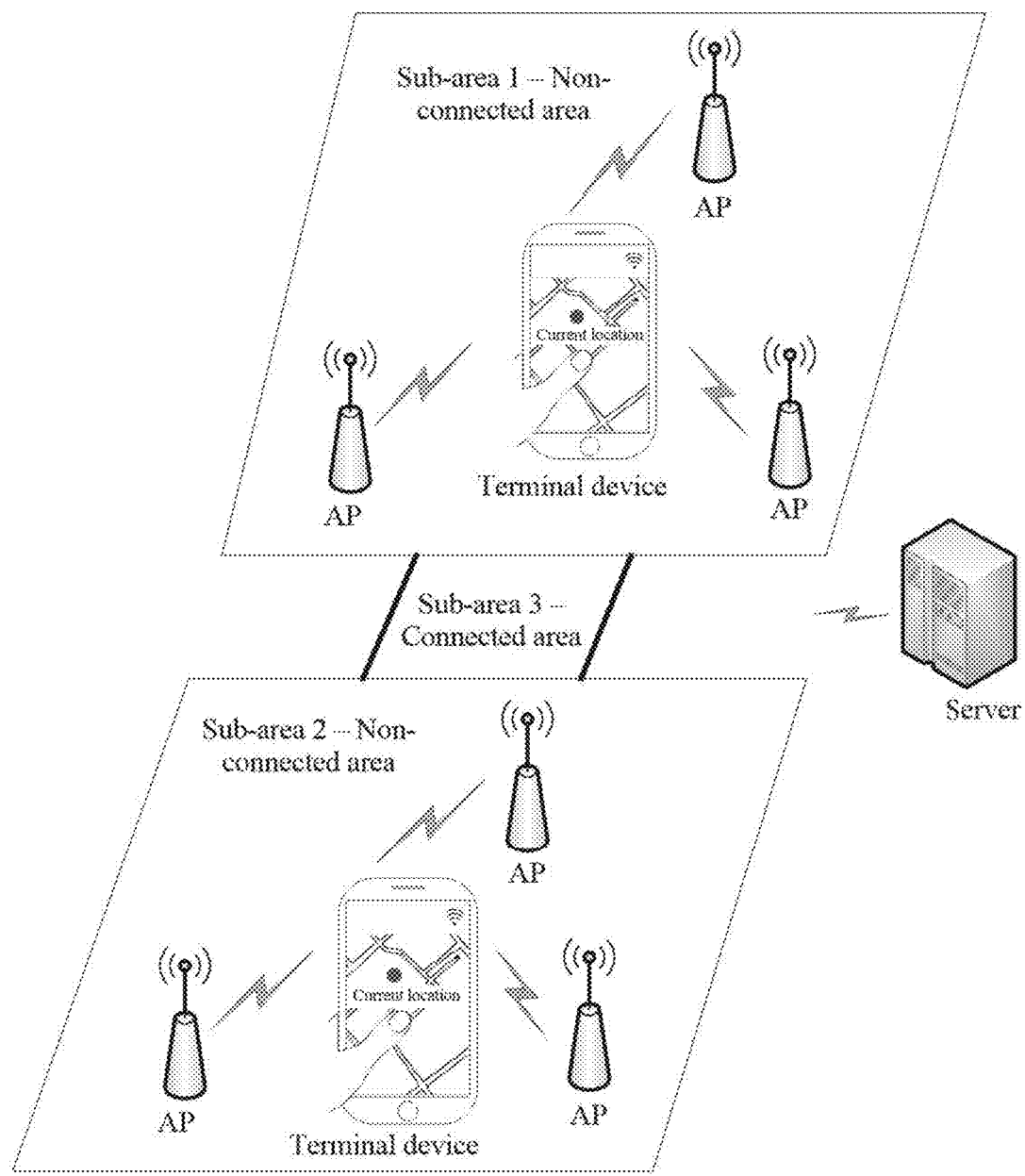
FIG. 5 is a schematic diagram of another specific application scenario of a fingerprint positioning method according to an embodiment of this application.

In a specific application scenario, FIG. 5 is a schematic diagram of a specific application scenario of a fingerprint positioning method according to an embodiment of this application. In FIG. 5, both a sub-area 1 and a sub-area 2 are non-connected areas, and a sub-area 3 is a connected area. When the terminal device moves from the sub-area 1 to the sub-area 2, the terminal device definitely needs to pass through the connected area, namely, the sub-area 3. Therefore, when a time interval between current positioning and last positioning is within a specific time range, in other words, when the terminal device has a limited moving range within the specific time range, if it is determined that a last positioning result of the terminal device is the sub-area 3, APs only need to be compared in reference AP sets corresponding to the sub-area 1, the sub-area 2, and the sub-area 3, thereby reducing a calculation amount of determining a sub-area, and improving positioning efficiency. It may be understood by persons skilled in the art that if positioning is not successfully performed in the reference AP sets corresponding to the sub-areas 1 to 3, a comparison range of the APs may be further extended to an area adjacent to the sub-areas 1 and 2, and details are not described herein.

In this embodiment of this application, in addition to retaining the method in the embodiment corresponding to FIG. 2 and corresponding beneficial effects, a main difference lies in that the time interval between the two times of positioning is further determined, and when a time difference between the two times of positioning is less than the preset time threshold, a fingerprint database used by the terminal device in last fingerprint positioning is still used, thereby omitting a step in which the terminal device needs to determine a fingerprint database used in current positioning, and improving positioning efficiency; alternatively, when a time difference between the two times of positioning is greater than the preset time threshold, not only a fingerprint database used by the terminal device in last fingerprint positioning is used, but a fingerprint database corresponding to a sub-area adjacent to the sub-area corresponding to the last positioning is also used, thereby also omitting a step in which the terminal device needs to determine a fingerprint database used in current positioning, and improving positioning efficiency.

Further, in this embodiment of this application, sub-areas in the to-be-positioned area may be further divided into two types: the connected area and the non-connected area, and different positioning matching calculation is performed based on a type of a sub-area that is positioned by the terminal device last time, to be specific, based on whether the sub-area is the connected area or the non-connected area, thereby further reducing a calculation amount of fingerprint positioning performed by the terminal device, and improving fingerprint positioning calculation efficiency.

The foregoing describes the method in the embodiments of this application, and the following provides an apparatus in the embodiments of this application.

Figure 6:
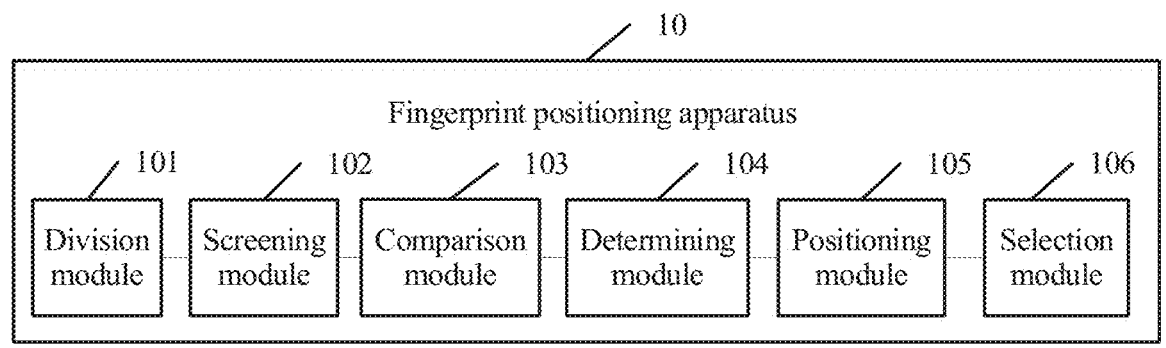
FIG. 6 is a schematic structural diagram of a fingerprint positioning apparatus according to an embodiment of this application.

FIG. 6 is a schematic structural diagram of a fingerprint positioning apparatus according to an embodiment of the present invention. The apparatus may include a division module 101, a screening module 102, a comparison module 103, a determining module 104, and a positioning module 105.

The division module 101 is configured to divide a to-be-positioned area into M sub-areas, where each sub-area has a corresponding fingerprint database, the fingerprint database includes a plurality of pieces of fingerprint data, the fingerprint data is a basic service set identifier BSSID and a received signal strength indicator RSSI of a wireless access point AP that are detected at each of a plurality of sampling points in a corresponding sub-area, and M is an integer greater than or equal to 1.

The screening module 102 is configured to: perform screening in the fingerprint database corresponding to each sub-area, and select BSSIDs of N APs in the fingerprint database to constitute a reference AP set, where the N APs are APs in the corresponding fingerprint database whose maximum RSSIs are greater than a preset threshold, N is an integer greater than 1, each sub-area corresponds to one reference AP set, and the M sub-areas correspond to M reference AP sets.

The comparison module 103 is configured to compare a BSSID of an AP received by a terminal device with BSSIDs in the M reference AP sets.

The determining module 104 is configured to determine a target reference AP set corresponding to a sub-area in which the terminal device is located.

The positioning module 105 is configured to perform positioning calculation based on a fingerprint database corresponding to the target reference AP set, to determine a location of the terminal device.

Optionally, the apparatus further includes:

a selection module 106, configured to select a fingerprint database based on a time interval between last positioning and current positioning to perform current positioning calculation.

Further, the selection module 106 is specifically configured to:

when the time interval between the two times of positioning is less than a preset time threshold, select a fingerprint database used in last positioning calculation to perform current positioning calculation.

Further, the selection module 106 is specifically configured to:

when the time interval between the two times of positioning is greater than a preset time threshold, select a fingerprint database used in last positioning calculation and an associated fingerprint database to perform current positioning calculation, where a sub-area corresponding to the associated fingerprint database is adjacent to a sub-area corresponding to the fingerprint database used in last positioning calculation.

Further, the determining module 104 is specifically configured to:

determine, as the target reference AP set, a reference AP set in the M reference AP sets that has a maximum quantity of elements in an intersection set with a first AP set, where the first AP set includes the BSSID of the AP currently received by the terminal device.

Further, the determining module 104 is specifically configured to:

determine, as the target reference AP set, a reference AP set in the M reference AP sets that has a maximum quantity of elements in an intersection set with a second AP set, where the second AP set includes BSSIDs that are currently received by the terminal device and that are of APs whose RSSIs meet a preset condition, the APs whose RSSIs meet the preset condition are APs corresponding to first X RSSIs in RSSIs that are ranked in descending order in a corresponding fingerprint database, and X is a positive number greater than or equal to 1, or the APs whose RSSIs meet the preset condition are APs corresponding to RSSIs in a top preset percentage of RSSIs that are ranked in descending order in a corresponding fingerprint database.

It may be understood that, for functions of the modules in the fingerprint positioning apparatus 10, refer to specific implementations in the method embodiments in FIG. 2 to FIG. 5. Details are not described herein again.

Figure 7:
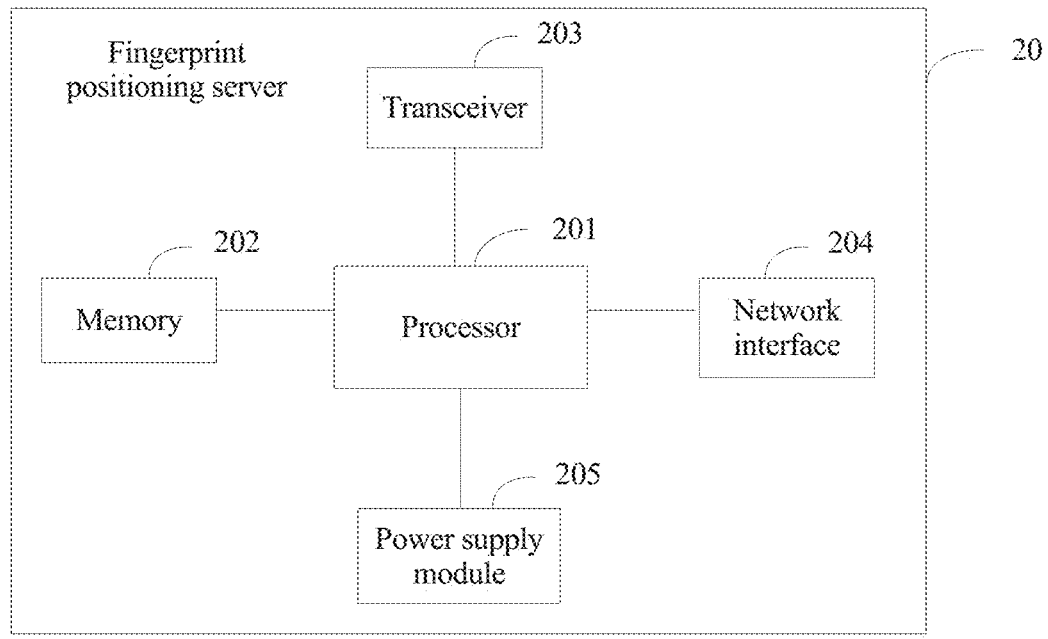
FIG. 7 is a schematic structural diagram of a fingerprint positioning server according to an embodiment of this application.

FIG. 7 is a schematic structural diagram of a fingerprint positioning server according to an embodiment of this application. As shown in FIG. 7, a fingerprint positioning server 20 includes a processor 201, a memory 202, and a transceiver 203. The processor 201, the memory 202, and the transceiver 203 may be connected by using a bus or in another manner.

Optionally, the fingerprint positioning server 20 may further include a network interface 204 and a power supply module 205.

The processor 201 may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The memory 202 is configured to store an instruction. During specific implementation, the memory 202 may be a read-only memory (English: Read-Only Memory, ROM for short) or a random access memory (English: Random Access Memory, RAM for short). In this embodiment of this application, the memory 202 is configured to store session connection establishment program code.

The transceiver 203 is configured to receive and send a signal, and is configured to communicate with another terminal device, for example, receive data from or send data to another sampling terminal device or positioning terminal device.

The network interface 204 is used by the fingerprint positioning server 20 to perform data communication with another device. The network interface 204 may be a wired interface or a wireless interface, and establish a communication connection between the fingerprint positioning server and another network communications device, for example, a terminal device, a base station, a server, or a security gateway, over a wired or wireless network.

The power supply module 205 is configured to supply power to each module of the fingerprint positioning server 20.

The processor 201 is configured to invoke the instruction stored in the memory 202 to perform the following operations:

dividing a to-be-positioned area into M sub-areas, where each sub-area has a corresponding fingerprint database, the fingerprint database includes a plurality of pieces of fingerprint data, the fingerprint data is a basic service set identifier BSSID and a received signal strength indicator RSSI of a wireless access points AP that are detected at each of a plurality of sampling points in a corresponding sub-area, and M is an integer greater than or equal to 1;

performing screening in the fingerprint database corresponding to each sub-area, and selecting BSSIDs of N APs in the fingerprint database to constitute a reference AP set, where the N APs are APs in the corresponding fingerprint database whose maximum RSSIs are greater than a preset threshold, N is an integer greater than 1, each sub-area corresponds to one reference AP set, and the M sub-areas correspond to M reference AP sets;

comparing a received BSSID of an AP with BSSIDs in the M reference AP sets, to determine a target reference AP set corresponding to a sub-area in which the terminal device is located, and performing positioning calculation based on a fingerprint database corresponding to the target reference AP set, to determine a location of the terminal device.

Specifically, the processor 201 is further configured to select a fingerprint database based on a time interval between last positioning and current positioning to perform current positioning calculation.

Further, that the processor 201 is further configured to select a fingerprint database based on a time interval between last positioning and current positioning to perform current positioning calculation is specifically:

when the time interval between the two times of positioning is less than a preset time threshold, selecting a fingerprint database used in last positioning calculation to perform current positioning calculation.

Further, that the processor 201 is further configured to select a fingerprint database based on a time interval between last positioning and current positioning to perform current positioning calculation is specifically:

when the time interval between the two times of positioning is greater than a preset time threshold, selecting a fingerprint database used in last positioning calculation and an associated fingerprint database to perform current positioning calculation, where a sub-area corresponding to the associated fingerprint database is adjacent to a sub-area corresponding to the fingerprint database used in last positioning calculation.

Further, that the processor 201 is further configured to compare a BSSID of an AP received by a terminal device with BSSIDs in the M reference AP sets, to determine a target reference AP set corresponding to a sub-area in which the terminal device is located is specifically:

determining, as the target reference AP set, a reference AP set in the M reference AP sets that has a maximum quantity of elements in an intersection set with a first AP set, where the first AP set includes the BSSID of the AP currently received by the terminal device.

Further, that the processor 201 is further configured to compare a BSSID of an AP received by a terminal device with BSSIDs in the M reference AP sets, to determine a target reference AP set corresponding to a sub-area in which the terminal device is located is specifically:

determining, as the target reference AP set, a reference AP set in the M reference AP sets that has a maximum quantity of elements in an intersection set with a second AP set, where the second AP set includes BSSIDs that are currently received by the terminal device and that are of APs whose RSSIs meet a preset condition, the APs whose RSSIs meet the preset condition are APs corresponding to first X RSSIs in RSSIs that are ranked in descending order in a corresponding fingerprint database, and X is a positive number greater than or equal to 1, or the APs whose RSSIs meet the preset condition are APs corresponding to RSSIs in a top preset percentage of RSSIs that are ranked in descending order in a corresponding fingerprint database.

It may be understood that, for functions of the modules in the server 20, refer to specific implementations in the method embodiments in FIG. 2 to FIG. 5. Details are not described herein again.

The embodiments of this application further provide a computer storage medium. The computer storage medium may store a program, and when the program is executed, at least some or all of the steps of any fingerprint positioning method recorded in the foregoing method embodiments may be performed.

In the foregoing embodiments, the descriptions of the embodiments have respective focuses. For a part that is not described in detail in an embodiment, refer to related descriptions in other embodiments.

It should be noted that, for brief description, the foregoing method embodiments are represented as a series of actions. However, persons skilled in the art should appreciate that this application is not limited to the described order of the actions, because according to this application, some steps may be performed in another order or simultaneously. It should be further appreciated by persons skilled in the art that all the embodiments described in this specification are preferred embodiments, and the involved actions and modules are not necessarily mandatory to this application.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk or a magnetic tape), an optical medium (for example, a DVD), a semiconductor medium (for example, a solid state disk (SSD)), or the like.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A system comprising:
an electronic device configured to:
  receive Wi-Fi broadcast information of first wireless access points (APs); and
  send first basic service set identifiers (BSSIDs) and corresponding received signal strength identifications (RSSIs) of the first wireless APs; and
a server communicatively coupled to the electronic device and configured to:
  receive the first BSSIDs and the RSSIs from the electronic device;
  divide a to-be-positioned area into sub-areas having corresponding fingerprint databases, wherein each of the fingerprint databases comprises a plurality of pieces of fingerprint data, and wherein the fingerprint data comprises a BSSID and an RSSI of a wireless AP detected at each of a plurality of sampling points in a corresponding sub-area of the sub-areas;
  screen the fingerprint databases;

determine reference AP sets by selecting, for each of the sub-areas, second BSSIDs of second APs in a fingerprint database corresponding to the sub-area to determine a reference AP set for the sub-area, wherein the second APs are APs whose maximum RSSIs are greater than a preset threshold;

compare the first BSSIDs with the second BSSIDs in the reference AP sets;

determine a target reference AP set corresponding to a sub-area in which the electronic device is located;

perform positioning calculation based on a first fingerprint database corresponding to the target reference AP set; and determine a location of the electronic device based on the positioning calculation.

2. The system of claim 1, wherein the server is further configured to select a fingerprint database based on a time interval between last positioning of the electronic device and current positioning of the electronic device to perform current positioning calculation.

3. The system of claim 2, wherein the server is further configured to select a fingerprint database used in a last positioning calculation corresponding to the last positioning of the electronic device to perform the current positioning calculation when the time interval is less than a preset time threshold.

4. The system of claim 2, wherein the server is further configured to select a fingerprint database used in a last positioning calculation corresponding to the last positioning of the electronic device and an associated fingerprint database to perform the current positioning calculation when the time interval is greater than a preset time threshold, and wherein a first sub-area corresponding to the associated fingerprint database is adjacent to a second sub-area corresponding to the fingerprint database used in the last positioning calculation.

5. The system of claim 1, wherein the server is further configured to determine, as the target reference AP set, a first AP set in the reference AP sets that has a maximum quantity of elements in an intersection set with a second AP set, and wherein the second AP set comprises a BSSID currently received by the electronic device.

6. The system of claim 1, wherein the server is further configured to determine, as the target reference AP set, a first AP set from the reference AP sets that has a maximum quantity of elements in an intersection set with a second AP set, wherein the second AP set comprises BSSIDs that are currently received by the electronic device and that have RSSIs that meet a preset condition, wherein the preset condition comprises first X RSSIs in RSSIs that are ranked in descending order in a corresponding fingerprint database, and wherein X is a positive number greater than or equal to one.

7. The system of claim 1, wherein the server is further configured to determine, as the target reference AP set, a first AP set from the reference AP sets that has a maximum quantity of elements in an intersection set with a second AP set, wherein the second AP set comprises BSSIDs that are currently received by the electronic device and that have RSSIs that meet a preset condition, and wherein the preset condition comprises RSSIs in a top preset percentage of RSSIs that are ranked in descending order in a corresponding fingerprint database.

8. A method, comprising:

dividing, by a server, a to-be-positioned area into sub-areas having corresponding fingerprint databases, wherein each of the fingerprint databases comprises a plurality of pieces of fingerprint data, and wherein the fingerprint data comprises a basic service set identifier (BSSID) and a received signal strength indicator (RSSI) of a wireless access point (AP) that are detected at each of a plurality of sampling points in a corresponding sub-area of the sub-areas;

screening, by the server, the fingerprint databases;

determining reference AP sets by selecting, for each of the sub-areas, second BSSIDs of second APs in a fingerprint database corresponding to the sub-area to determine a reference AP set for the sub-area, wherein the second APs are APs whose maximum RSSIs are greater than a preset threshold;

receiving, by an electronic device, Wi-Fi broadcast information of first wireless APs;

sending, by the electronic device, first BSSIDs and corresponding RSSIs of the first wireless APs to the server;

comparing, by the server, the first BSSIDs with the second BSSIDs;

determining, by the server, a target reference AP set corresponding to a sub-area in which the electronic device is located;

performing, by the server, positioning calculation based on a fingerprint database corresponding to the target reference AP set; and determining, by the server, a location of the electronic device based on the positioning calculation.

9. The method of claim 8, wherein the method further comprises selecting, by the server, a fingerprint database based on a time interval between a last positioning of the electronic device and a current positioning of the electronic device to perform current positioning calculation.

10. The method of claim 9, wherein the method further comprises selecting, by the server, a fingerprint database used in a last positioning calculation corresponding to the last positioning of the electronic device to perform the current positioning calculation when the time interval is less than a preset time threshold.

11. The method of claim 9, wherein the method further comprises selecting, by the server, a fingerprint database used in a last positioning calculation corresponding to the last positioning of the electronic device and an associated fingerprint database to perform the current positioning calculation when the time interval is greater than a preset time threshold, and wherein a sub-area corresponding to the associated fingerprint database is adjacent to a sub-area corresponding to the fingerprint database used in the last positioning calculation.

12. The method of claim 8, wherein the method further comprises determining, by the server, as the target reference AP set, a first AP set in the reference AP sets that has a maximum quantity of elements in an intersection set with a second AP set, and wherein the second AP set comprises a BSSID currently received by the electronic device.

13. The method of claim 8, wherein the method further comprises determining a first AP set from the reference AP sets that has a maximum quantity of elements in an intersection set with a second AP set, wherein the second AP set comprises BSSIDs that are currently received by the electronic device and that have RSSIs that meet a preset condition, wherein the preset condition comprises first X RSSIs in RSSIs that are ranked in descending order in a corresponding fingerprint database, and wherein X is a positive number greater than or equal to one.

14. The method of claim 8, wherein the method further comprises determining a first AP set from the reference AP sets that has a maximum quantity of elements in an intersection set with a second AP set, wherein the second AP set comprises BSSIDs that are currently received by the electronic device and that have RSSIs that meet a preset condition, and wherein the preset condition comprises RSSIs in a top preset percentage of RSSIs that are ranked in descending order in a corresponding fingerprint database.

15. A computer program product comprising computer-executable instructions stored on a non-transitory computer-readable medium that, when executed by a processor, cause a server to:
  divide a to-be-positioned area into sub-areas having corresponding fingerprint databases, wherein each of the fingerprint databases comprises a plurality of pieces of fingerprint data, and wherein the fingerprint data comprises a basic service set identifier (BSSID) and a received signal strength indicator (RSSI) of a wireless access point (AP) that are detected at each of a plurality of sampling points in a corresponding sub-area of the sub-areas;
  screen the fingerprint databases;
  determine reference AP sets by selecting, for each of the sub-areas, second BSSIDs of second APs in a fingerprint database corresponding to the sub-area to determine a reference AP set for the sub-area, wherein the second APs are APs whose maximum RSSIs are greater than a preset threshold;
  send, to an electronic device, Wi-Fi broadcast information of first wireless APs;
  receive, from the electronic device, first BSSIDs and corresponding RSSIs of the first wireless APs;
  compare the first BSSIDs of wireless APs with second BSSIDs;
  determine a target reference AP set corresponding to a sub-area in which the electronic device is located;
  perform positioning calculation based on a fingerprint database corresponding to the target reference AP set; and
  determine a location of the electronic device based on the positioning calculation.

16. The computer program product of claim 15, wherein the instructions further cause the server to select a fingerprint database based on a time interval between a last positioning of the electronic device and a current positioning of the electronic device to perform current positioning calculation.

17. The computer program product of claim 16, wherein the instructions further cause the server to select a fingerprint database used in last positioning calculation corresponding to the last positioning of the electronic device to perform the current positioning calculation when the time interval is less than a preset time threshold.

18. The computer program product of claim 16, wherein the instructions further cause the server to select a fingerprint database used in a last positioning calculation corresponding to the last positioning of the electronic device and an associated fingerprint database to perform current positioning calculation when the time interval is greater than a preset time threshold, and wherein a first sub-area corresponding to the associated fingerprint database is adjacent to a second sub-area corresponding to the fingerprint database used in the last positioning calculation.

19. The computer program product of claim 15, wherein the instructions further cause the server to determine a first AP set in the reference AP sets that has a maximum quantity of elements in an intersection set with a second AP set, and wherein the second AP set comprises a BSSID currently received by the electronic device.

20. The computer program product of claim 15, wherein the instructions further cause the server to determine a first AP set in the reference AP sets that has a maximum quantity of elements in an intersection set with a second AP set, wherein the second AP set comprises BSSIDs that are currently received by the electronic device and that have RSSIs that meet a preset condition, and wherein the preset condition comprises RSSIs in a top preset percentage of RSSIs that are ranked in descending order in a corresponding fingerprint database.

* * * * *

UNITED STATES PATENT AND TRADEMARK OFFICE
CERTIFICATE OF CORRECTION

PATENT NO. : 11,044,689 B2  
APPLICATION NO. : 16/499584  
DATED : June 22, 2021  
INVENTOR(S) : Yunsheng Kuang It is certified that error appears in the above-identified patent and that said Letters Patent is hereby corrected as shown below:

On the Title Page

Item (57) Abstract, Line 12: "bused on a fingerprint" should read "based on a fingerprint"

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*